United States Patent
Salter

(10) Patent No.: US 8,612,946 B2
(45) Date of Patent: Dec. 17, 2013

(54) CROSS-BUILDING SUPPORT USING DEPENDENCY INFORMATION

(75) Inventor: Mark O. Salter, Cumming, GA (US)

(73) Assignee: Red Hat, Inc., Raleigh, NC (US)

( * ) Notice: Subject to any disclaimer, the term of this patent is extended or adjusted under 35 U.S.C. 154(b) by 758 days.

(21) Appl. No.: 12/781,615

(22) Filed: May 17, 2010

(65) Prior Publication Data

US 2011/0283268 A1  Nov. 17, 2011

(51) Int. Cl.
   *G06F 9/45*  (2006.01)
   *G06F 9/445*  (2006.01)

(52) U.S. Cl.
   USPC ............ 717/140; 717/143; 717/159; 717/178

(58) Field of Classification Search
   None
   See application file for complete search history.

(56) References Cited

U.S. PATENT DOCUMENTS

| | | | |
|---|---|---|---|
| 6,519,767 B1 * | 2/2003 | Carter et al. ................. | 717/140 |
| 7,376,945 B1 * | 5/2008 | Kakumani et al. ........... | 717/171 |
| 7,458,073 B1 * | 11/2008 | Darling et al. ............... | 717/168 |
| 8,327,343 B2 * | 12/2012 | Klein et al. ................... | 717/159 |
| 2004/0003390 A1 * | 1/2004 | Canter et al. ................. | 717/178 |
| 2004/0025151 A1 * | 2/2004 | Ku ................................ | 717/159 |
| 2005/0114847 A1 * | 5/2005 | Whalley ........................ | 717/140 |
| 2005/0289530 A1 * | 12/2005 | Robison ........................ | 717/159 |
| 2006/0136881 A1 * | 6/2006 | Nesbitt et al. ................. | 717/140 |
| 2006/0277542 A1 * | 12/2006 | Wipfel .......................... | 717/174 |
| 2007/0061801 A1 * | 3/2007 | Chang et al. ................. | 717/174 |
| 2008/0028372 A1 * | 1/2008 | Garms et al. ................. | 717/140 |
| 2008/0066062 A1 * | 3/2008 | Zatloukal et al. ............. | 717/143 |
| 2008/0072211 A1 * | 3/2008 | Rothman et al. .............. | 717/122 |
| 2008/0127131 A1 * | 5/2008 | Gao et al. ...................... | 717/140 |
| 2009/0249277 A1 * | 10/2009 | Prakash ......................... | 717/100 |
| 2009/0282403 A1 * | 11/2009 | Poole et al. ................... | 717/178 |
| 2009/0300604 A1 * | 12/2009 | Barringer ...................... | 717/178 |
| 2010/0070956 A1 * | 3/2010 | Leung et al. .................. | 717/143 |
| 2010/0138816 A1 * | 6/2010 | Mokrani et al. .............. | 717/143 |

OTHER PUBLICATIONS

Neeraj Sangal, Using dependency models to manage complex software architecture, 2005, pp. 2-8.*
Fabio Mancinelli, Managing the comlexity of large free an open source package-based software distributions, 2006, pp. 2-5.*
Daniel M German, A model to understand the building and running inter-dependencies of software, 2007, pp. 1-8.*

* cited by examiner

*Primary Examiner* — Thuy Dao
*Assistant Examiner* — Mongbao Nguyen
(74) *Attorney, Agent, or Firm* — Lowenstein Sandler LLP

(57) ABSTRACT

A mechanism for cross-building support using dependency information is disclosed. A method of the invention includes parsing a source code package received for compilation in a binary source code package for a target machine, the parsing to determine a list of dependency packages needed to compile the source code package, for each dependency package in the list of dependency packages determining a type of the dependency package and associating an architecture of at least one of a build machine compiling the source code package or the target machine with the dependency package based on a determined type of the dependency package, downloading each dependency package in the list of dependency packages in a binary form of the build architecture format, and downloading each dependency package that is associated with the target machine in a binary form of the target architecture format.

20 Claims, 4 Drawing Sheets

200

```
Receive source code package for compilation into binary code
                                                           210
```
↓
```
Parse source code package to determine list of dependency packages needed to
compile the source code package
                                                           220
```
↓
```
Download each dependency package in a binary format of the build architecture
                                                           230
```
↓
```
For each dependency package, determine a type of the dependency package
                                                           240
```
↓
```
Associate one of the build architecture or the target architecture with each
dependency package based on the determined type of the dependency package
                                                           250
```
↓
```
For each dependency package associated with the target architecture, download
those dependency packages in a binary format of the target architecture
                                                           260
```
↓
```
Compile source code package into binary code package of target machine
architecture
                                                           270
```
↓
```
Provide compiled binary code package to the target machine architecture
                                                           280
```

*Fig. 2*

CROSS-BUILDING SUPPORT USING DEPENDENCY INFORMATION

TECHNICAL FIELD

The embodiments of the invention relate generally to software package building and, more specifically, relate to a mechanism for cross-building support using dependency information.

BACKGROUND

Many times, software is delivered in "packages". The process of building these packages starts with a "source" package that contains the actual source code plus information on how that source code should be "compiled" into a binary package form. The binary packages are ones that would be installed on an end user system. A single source package may be built on various systems (of different CPU architectures) so that the resulting binary packages are compatible with the various architectures (e.g., 32-bit Intel, 64-bit Intel, PowerPC, S390, etc). Some organizations perform "native building," which means that the machine used to build a binary package from a source package ("build machine") is the same architecture as the machine used to install the binary package ("target machine"). For example, a PowerPC based machine is used to build a binary package for a PowerPC-based target machine, an S390-based machine is used to build a binary package for an S390-based target machine, etc. The build operations typically require a relatively large amount of compute resources (CPU speed, RAM space, disk space, etc), so typically dedicated build machines are set aside at an organization to perform the build process.

However, smaller devices that use CPUs, such as embedded CPUs, are not really suitable for use as build machines. For example, cell phones often use ARM CPUs with no disk space and just a small amount of RAM. Because these devices are special-purpose machines, they typically cannot run the tools and utilities needed to build the binary packages. In order to build packages for such devices, a different and more powerful build machine, such as an Intel-based desktop PC, should be used to create the binary package for these devices. This is referred to as "cross-building."

Cross-building of software packages is not new. Over the years, various approaches have been provided for cross-building. Typically, these approaches involve a fair amount of manual setup to satisfy build dependencies. That is, each package to be built requires that certain other packages be installed (i.e., dependencies). For instance, a package for a word processor application may require spell check libraries provided by some other package. So, before building the word processor package, the spell check package containing those libraries must be installed. A given source package contains lists of other packages that are required for building that source package.

Generally, a utility that manages the building of software packages will read a list of build prerequisites from a source package and then fetch and install those prerequisites before doing the actual build setup. This works fine for native building but this problem space is more complicated for cross-building and the utility is not able to adequately handle those differences. For cross-building, there are two types of build dependencies: (1) libraries of the architecture for the target machine (not for the build machine), and (2) utilities/tools needed to run on the build machine (not for the target machine architecture). The problem is that the managing utility will assume that all build dependencies are based on the build machine architecture, thereby not providing the correct package dependencies for a cross-building situation.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 2 is a flow diagram illustrating a method for cross-building support using dependency information according to an embodiment of the invention;

DETAILED DESCRIPTION

Figure 1:
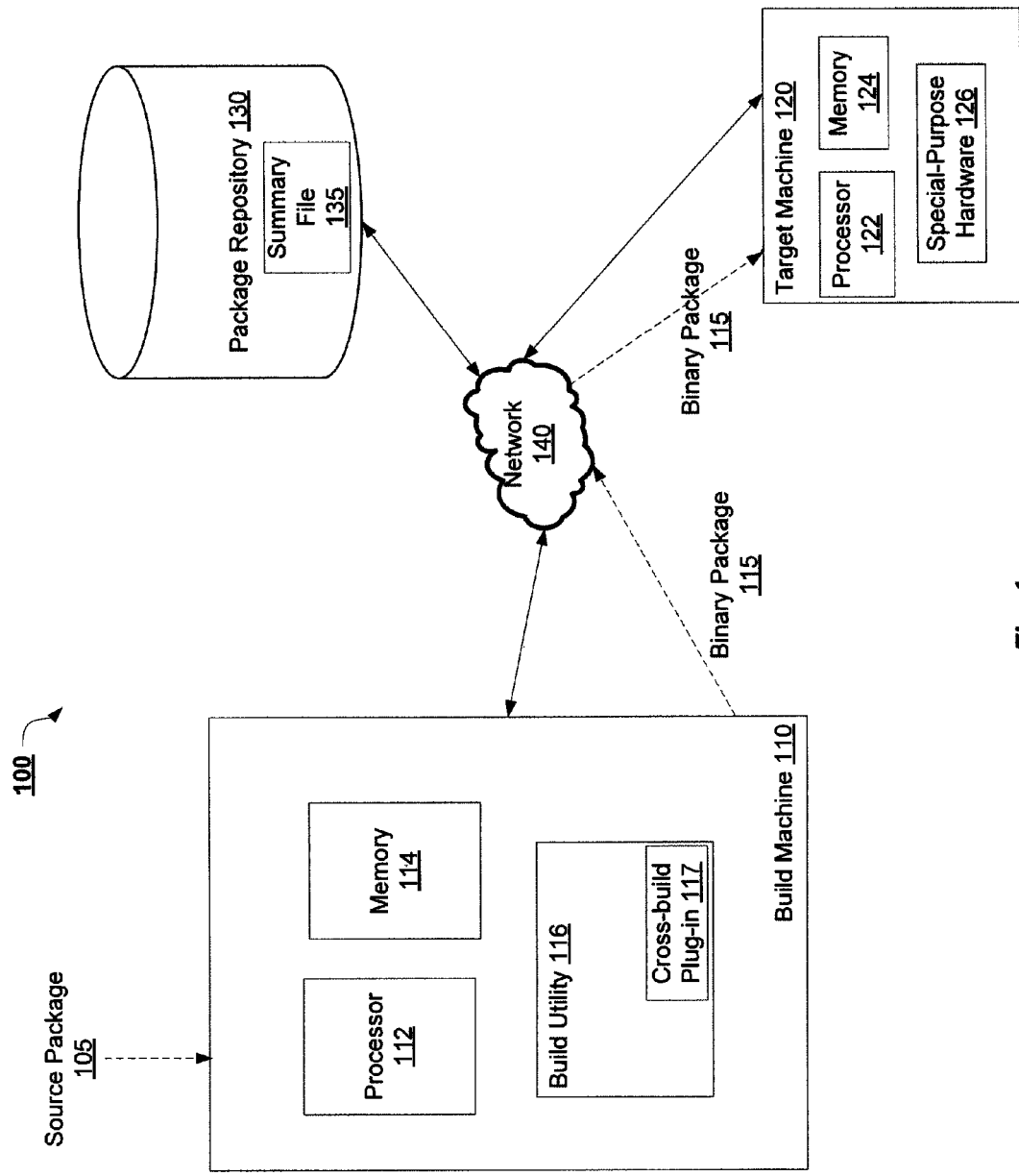
FIG. 1 is a block diagram of a package building system according to an embodiment of the invention.

Embodiments of the invention provide a mechanism for cross-building support using dependency information. A method of embodiments of the invention includes parsing a source code package received for compilation into a binary source code package for a target machine, the parsing to determine a list of dependency packages needed to compile the source code package, for each dependency package in the list of dependency packages determining a type of the dependency package and associating an architecture of at least one of a build machine compiling the source code package or the target machine with the dependency package based on a determined type of the dependency package, downloading each dependency package in the list of dependency packages in a binary form of the build architecture format, and downloading each dependency package that is associated with the target machine in a binary form of the target architecture format.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "parsing", "determining", "associating", "downloading", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for cross-building support using dependency information. That is, embodiments of the invention extend a package build managing utility to work for cross-building as well. One of the main problems is that the utility assumes that all build prerequisites need to be packages for the CPU architecture of the build machine. However, for cross-building, this is not the case. If an Intel-based PC is used to build packages for an ARM-based cell phone, any software libraries needed for the build must be ARM binaries. On the other hand, some build prerequisites are for utilities used during the build process. That is, the build process may need to run a utility on the build machine. In that case, the package used to satisfy that dependency must be of the same architecture as the build machine. Embodiments of the invention provide a "plug-in" for the build managing utility that extends its functionality to properly handle these build dependencies for cross-building.

FIG. 1 is a block diagram of a package building system 100 according to an embodiment of the invention. Package building system 100 includes a build machine 110, a target machine 120, and a package repository 130, all communicably coupled via network 140. Network 140 may be a local area network (LAN), a wide area network (WAN), an intranet, an extranet, or the Internet, to name a few examples.

Build machine 110 may be a computing device capable of compiling a source code software package into a binary code software package. More specifically, build machine 110 may include, but is not limited to, a processor 112, a memory 114, and a build utility 116 that assist in accomplishing the compiling of a source package 105 into a binary package 115 according to embodiments of the invention. Build machine 110 includes a build utility 116 that manages the compilation process of source package 105 into binary package 115. The binary package 115 is sent to target machine 120 for its eventual installation on target machine 120.

In some embodiments, target machine 120 may be a smaller device with a processor 122, a memory 124, and other special-purpose hardware. Typically, the processor 122 is a general-purpose processor used in special purpose devices that may lack sufficient power to be used as a build machine. Furthermore, the memory 124 and other special-purpose hardware 126 may have limited resources for build machine purposes. In such a case, the architecture of target machine 120 cannot be used as a build machine 110 for compiling source packages 105 into binary packages 115. As previously discussed, such a scenario results in cross-building, where the architecture of build machine 110 is not the same architecture as target machine 120.

In the case of cross-builds, embodiments of the invention provide a cross-build plug-in 117 for build utility 116. In one embodiment, the cross-build plug-in 117 is a software module that overrides the default behavior of the build utility 116 of assuming that all required dependencies for a package are based in the same binary code as the build machine 110 architecture. Specifically, in one embodiment, the cross-build plug-in 117 includes scripts that generate a complete list of all dependencies needed by a package and determine the architecture needed for each dependency. Each source package 105 to be compiled includes a list of all libraries and utilities (i.e., dependencies) needed to compile the package, and each of these dependencies may also have their own dependencies. The plug-in may access a separate package repository 130 to determine what other dependencies a source package dependency may have.

In one embodiment, the package repository 130 includes a plurality of binary code packages for a variety of different architectures. In some embodiments, although not particularly illustrated, more than one repository 130 may be utilized, with, for example, each repository 130 hosting binary packages for a particular architecture. Other organizations of binary packages may also be utilized in embodiments of the invention.

Once a complete list of dependencies is assembled, the plug-in 117 looks at the contents of each dependency and determines which architecture (the build or target architecture) the binary form of the dependency should take. In general, a library dependency will take the binary form of the target machine 120 architecture and a utility dependency will take the binary form of the build machine 110 architecture.

In embodiments of the invention, the actual binary package of the dependency does not need to be downloaded from the repository 130. Instead, the repository 130 may include a summary file 135 of the contents of the repository 130. The plug-in 117 may access this summary file 135 to examine description information associated with the particular dependency. For instance, for each package in the repository 130, the summary file 135 may contain a list of all files contained in the package that would be installed, a list of all other package dependencies required by that package, and a metatag description of what the package provides (e.g., word processor, spell check library, etc.). One skilled in the art will appreciate that the summary file may include more or less information than that which was just described.

For each dependency required by a source package 105, cross-build plug-in 117 of build utility 116 examines the summary file information to determine the type of the required dependency. Based on this information, the plug-in can then decide which architecture form the binary package dependency should fall under. The build utility 116 will automatically download all dependency packages in the binary form of the build architecture format. The cross-build utility 117 will apply on top of this and instruct the build utility to additionally download the dependency packages determined to be associated with the target architecture in the binary form of the target architecture format from the repository 130. In addition, the cross-build plug-in can have the build utility 116 use that dependency if it is already found on the build machine 110. Once the build machine 110 compiles the source package 105 into the binary form 115, this binary package 115 is sent on to the target machine 120 for installation.

FIG. 2 is a flow diagram illustrating a method 200 for cross-building support using dependency information according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by build machine 110 of FIG. 1.

Method 200 begins at block 210 where a source code package is received at a build machine for compilation into a binary code package. The source code package is to be compiled by the build machine into a binary code format of a target machine that is different from the architecture format of the build machine, i.e., cross-building. At block 220, the source code package is parsed to determine a list of dependency packages needed to compile the source code package. In some embodiments, the source code package includes header information that lists the required dependencies for the source code package.

At block 230, each dependency package is downloaded from a repository in the binary form of the build architecture format. This is the default behavior of the general build utility. In some embodiments, the repository is separate from the build machine and stores various binary packages used for compiling a source code package. The repository may include a single database or multiple databases.

Subsequently, at block 240, for each dependency package, a type of the dependency package is determined. Then, at block 250, each dependency package is associated with one of either the build architecture or the target architecture based on the determined type of the dependency package. In some embodiments, if the dependency package is determined to be a library, then the dependency package is associated with the target machine architecture. If the dependency package is determined to be a utility, then the dependency package is associated with the build machine architecture.

At block 260, for each dependency package associated with the target architecture, download those dependency packages from the repository in the binary form of the target architecture format . Then, at block 270, the source code package is compiled into a binary code package for the target machine architecture. The dependency packages are used to help compile the source code package into binary code, and in some cases, are included in the compilation of the source code package into binary code. The compiled binary code package is then provided to the target machine at block 280.

Figure 3:
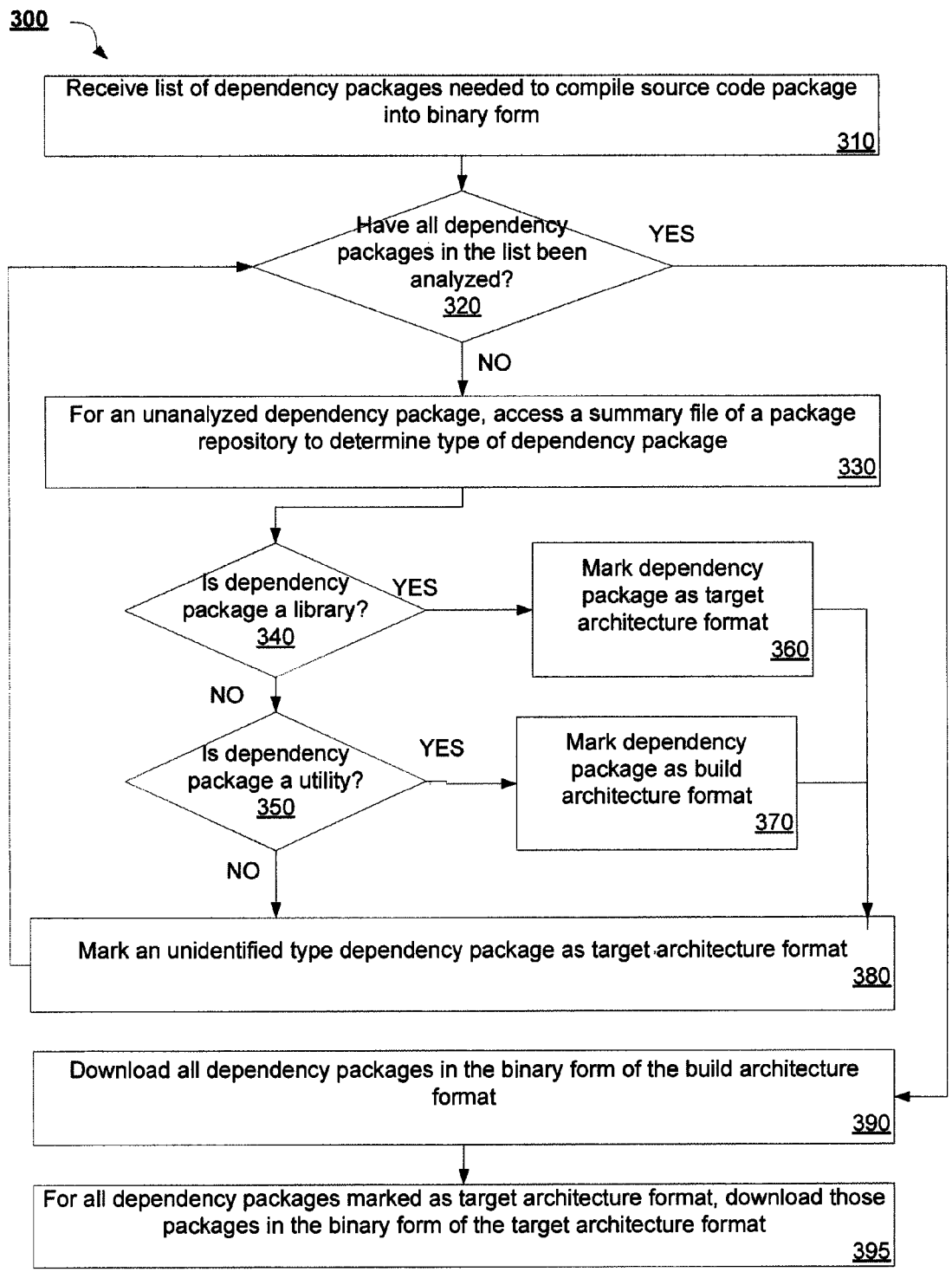
FIG. 3 is a flow diagram illustrating another method for cross-building support using dependency information according to an embodiment of the invention.

FIG. 3 is a flow diagram illustrating another method 300 for cross-building support using dependency information according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 provides further detail with regard to block 230 of FIG. 2. In one embodiment, method 300 is performed by build machine 110, and specifically cross-build plug-in 117, of FIG. 1.

Method 300 begins at block 310 where a list of dependency packages needed to compile a source code package into binary form is received. The source code package is to be compiled by the build machine into a binary code format of a target machine that is different from the architecture format of the build machine, i.e., cross-building. Then, at decision block 320, it is determined whether all dependency packages in the list have been analyzed. If not, then at block 330, for an unanalyzed dependency package, a summary file of a package repository is accessed to determine a type of the dependency package. In some embodiments, the summary file includes a list of all files included in each dependency package and a description of the dependency package itself. Using this information, the cross-build plug-in is able to determine a type of the dependency package.

At decision block 340, if the dependency package is determined to be a library, then the dependency package is marked as a target machine architecture format at block 360. If the dependency package is not a library, then at decision block 350 it is determined whether the dependency package is a utility. If so, then at block 370 the dependency package is marked as the build machine architecture format. Blocks 360 and 370, as well as a negative response to decision block 305, proceed to block 380 where an unidentified type dependency package is marked as the target machine architecture format. Method 300 then proceeds back to decision block 320.

If at decision block 320 it is determined that all dependency packages have been analyzed, then method 300 continues to block 390 where all analyzed dependency packages are downloaded in the binary form of the build architecture format. This is the default behavior of the build utility. However, embodiments of the invention provide the additional function of the cross-build plug-in at block 395. At block 395, for all dependency packages marked as the target architecture format, these packages are additionally downloaded in the binary form of the target architecture format. At this point, control of the compilation process may pass back to the build utility to finish compiling the source code package into a binary code package for the target machine.

Figure 4:
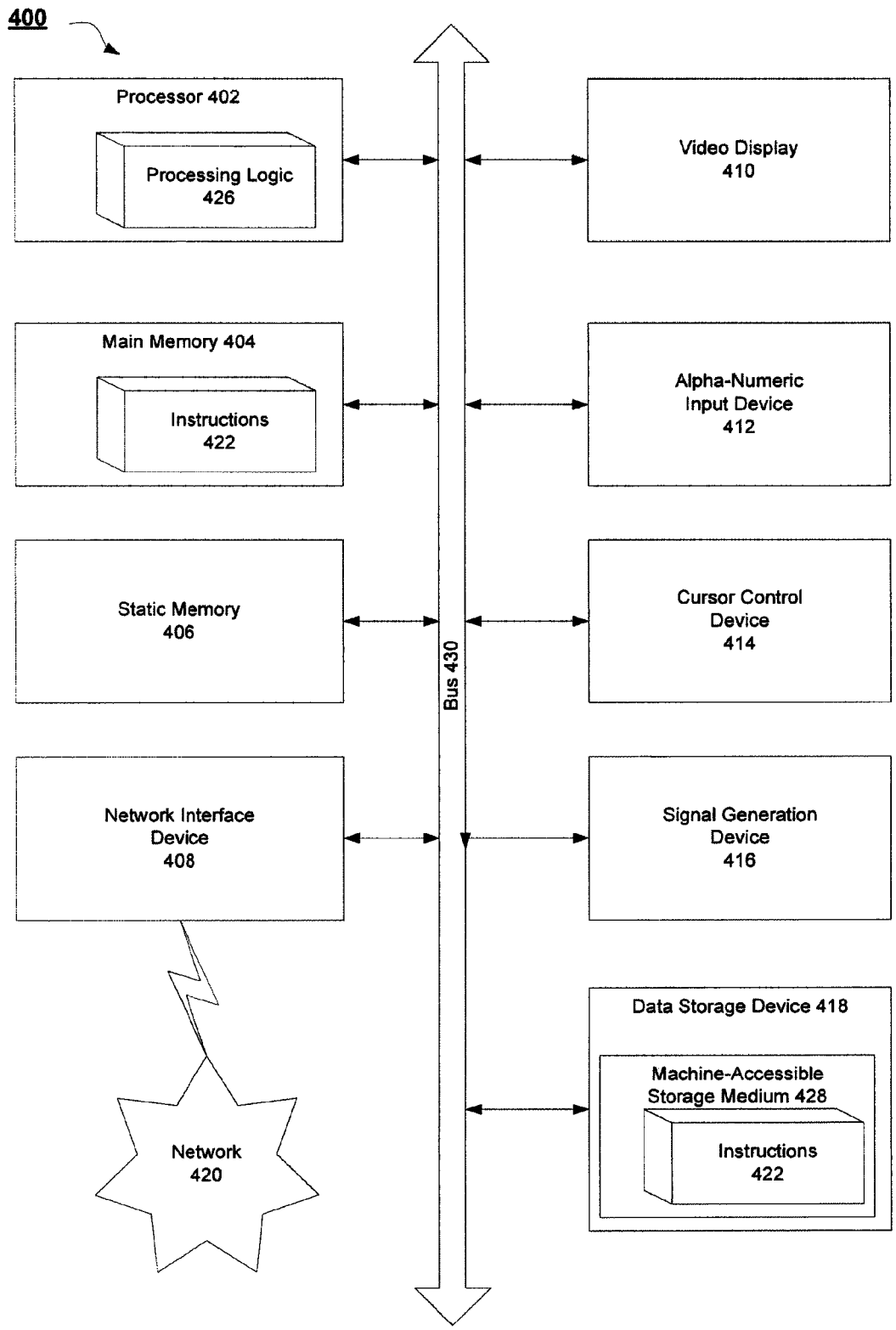
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform cross-building support using dependency information by build machine 110 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform methods 200 and 300 for cross-building support using dependency information described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    parsing, by a processing device of a build machine, a source code package received for compilation into a binary source code package for installation by a target machine that is separate from the build machine, the parsing to determine a list of dependency packages utilized to compile the source code package;
    for each dependency package in the list of dependency packages:
        determining, by the processing device, a type of the dependency package, wherein the type comprises one of a package used for a build process of the source code package or a package used by the target machine; and
        associating, by the processing device, the dependency package with an architecture of one of the build machine or the target machine based on the determined type of the dependency package, wherein if the type of the dependency package is a library, then the dependency package is associated with the target machine architecture and if the type of the dependency package is a utility, then the dependency package is associated with the build architecture;
    downloading, by the processing device, all dependency packages in a binary form of the build architecture format;
    downloading, by the processing device, each dependency package that is associated with the architecture of the target machine in a binary form of the target architecture format; and
    compiling the source code package into the binary code package for the target machine utilizing the downloaded dependency packages in the binary form of their associated architecture format.

2. The method of claim 1, wherein a cross-build plug-in of a build utility of the build machine performs the determining and associating for each dependency package.

3. The method of claim 1, wherein the architecture of the build machine and the architecture of the target machine are not the same.

4. The method of claim 3, wherein the architecture of the target machine is for an embedded processor of a special-purpose device.

5. The method of claim 1, wherein determining the type of the dependency package further comprises accessing a package repository communicably coupled to the build machine that stores the dependency packages in order to determine the type of each dependency package.

6. The method of claim 5, wherein accessing the package repository to determine the type further comprising accessing a summary file of the package repository to examine a list of files and description for each dependency package that identifies the type of the dependency package.

7. The method of claim 1, further comprising:
providing the compiled binary code package to the target machine.

8. A build machine, comprising:
a processing device;
a memory coupled to the processing device; and
a build utility executable from the memory by the processing device, the build utility comprising a cross-build plug-in and the build utility to:
parse a source code package received for compilation into a binary source code package for a target machine, the parsing to determine a list of dependency packages needed to compile the source code package;
for each dependency package in the list of dependency packages:
determine a type of the dependency package, wherein the type comprises one of a package used for a build process of the source code package or a package used by the target machine; and
associate the dependency package with an architecture of one of the build machine or the target machine based on the determined type of the dependency package, wherein if the type of the dependency package is a library, then the dependency package is associated with the target machine architecture and if the type of the dependency package is a utility, then the dependency package is associated with the build architecture;
download all dependency packages in a binary form of the build architecture format;
download each dependency package that is associated with the architecture of the target machine in a binary form of the target architecture format; and
compile the source code package into the binary code package for the target machine utilizing the downloaded dependency packages in the binary form of their associated architecture format.

9. The system of claim 8, wherein the architecture of the build machine and the architecture of the target machine are not the same.

10. The system of claim 9, wherein the architecture of the target machine is for an embedded processor of a special-purpose device.

11. The system of claim 8, wherein determining the type of the dependency package further comprises accessing a package repository communicably coupled to the build machine that stores the dependency packages in order to determine the type of each dependency package.

12. The system of claim 11, wherein accessing the package repository to determine the type further comprising accessing a summary file of the package repository to examine a list of files and description for each dependency package that identifies the type of the dependency package.

13. The system of claim 8, wherein the build utility further to:
provide the compiled binary code package to the target machine.

14. A non-transitory machine-readable storage medium including data that, when accessed by a processing device, cause the processing device to perform operations comprising:
parsing, by the processing device, a source code package received for compilation into a binary source code package for a target machine, the parsing to determine a list of dependency packages needed to compile the source code package;
for each dependency package in the list of dependency packages:
determining, by the processing device, a type of the dependency package, wherein the type comprises one of a package used for a build process of the source code package or a package used by the target machine; and
associating, by the processing device, the dependency package with an architecture of one of the build machine or the target machine based on the determined type of the dependency package, wherein if the type of the dependency package is a library, then the dependency package is associated with the target machine architecture and if the type of the dependency package is a utility, then the dependency package is associated with the build architecture;
downloading all dependency packages in a binary form of the build architecture format;
downloading each dependency package that is associated with the architecture of the target machine in a binary form of the target architecture format; and
compiling the source code package into the binary code package for the target machine utilizing the downloaded dependency packages in the binary form of their associated architecture format.

15. The non-transitory machine-readable storage medium of claim 14, wherein the architecture of the build machine and the architecture of the target machine are not the same.

16. The non-transitory machine-readable storage medium of claim 14, wherein determining the type of the dependency package further comprises accessing a package repository communicably coupled to the build machine that stores the dependency packages in order to determine the type of each dependency package.

17. The non-transitory machine-readable storage medium of claim 14, wherein the machine-readable storage medium includes data that, when accessed by a machine, cause the machine to perform further operations comprising:
providing the compiled binary code package to the target machine.

18. The system of claim 8, wherein the cross-build plug-in of the build utility to perform the determining and the associating for each dependency package.

19. The non-transitory machine-readable storage medium of claim 14, wherein the architecture of the target machine is for an embedded processor of a special-purpose device.

20. The non-transitory machine-readable storage medium of claim 16, wherein accessing the package repository to determine the type further comprising accessing a summary file of the package repository to examine a list of files and description for each dependency package that identifies the type of the dependency package.

* * * * *